Oct. 17, 1950 C. W. LEIGHNOR 2,525,917
TANDEM TRACTOR HITCH
Filed July 19, 1949 2 Sheets-Sheet 1

INVENTOR.
CLARK W. LEIGHNOR
BY
McMorrow, Berman + Davidson
ATTORNEYS

Oct. 17, 1950        C. W. LEIGHNOR        2,525,917
TANDEM TRACTOR HITCH
Filed July 19, 1949        2 Sheets-Sheet 2
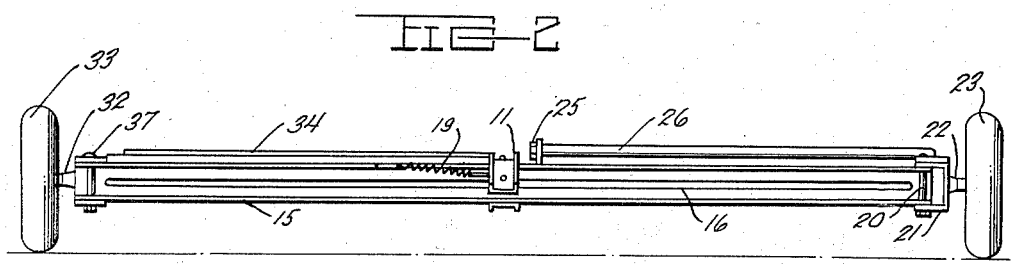
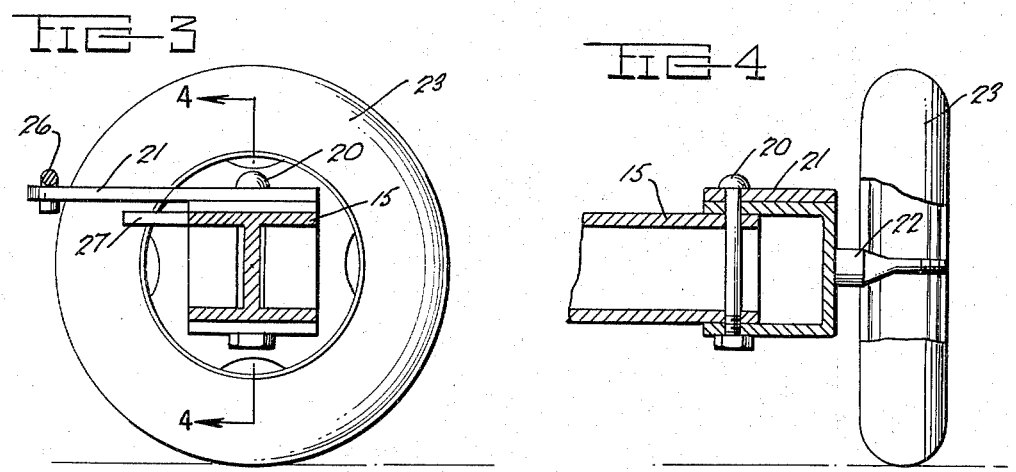
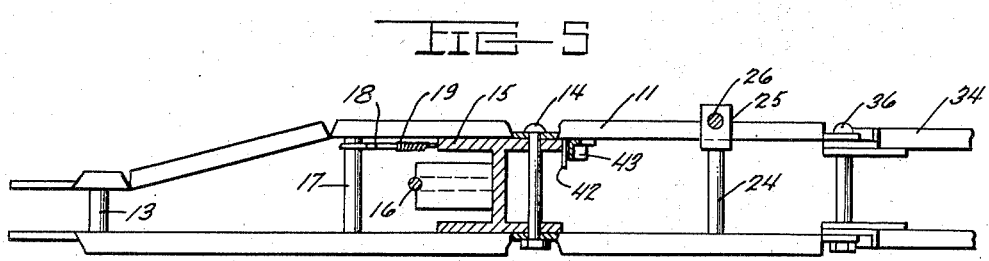
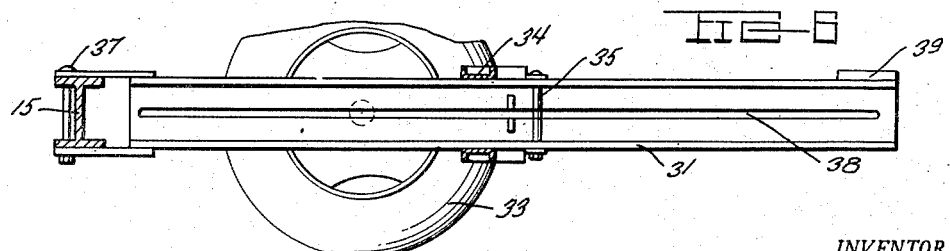
INVENTOR.
CLARK W. LEIGHNOR
BY
McMorrow, Berman & Davidson
ATTORNEYS Patented Oct. 17, 1950

2,525,917

UNITED STATES PATENT OFFICE 2,525,917

TANDEM TRACTOR HITCH

Clark W. Leighnor, Hutchinson, Kans.

Application July 19, 1949, Serial No. 105,483

4 Claims. (Cl. 280—33.5)

This invention relates to tractor hitch devices for agricultural implements, and more particularly to a tandem hitch device whereby two different agricultural implements may be simultaneously drawn by a tractor.

A main object of the invention is to provide a novel and improved tandem hitch device for attaching two agricultural implements to a tractor, said device being simple in construction, allowing the tractor to be turned to the right or left without piling up of the tools being drawn thereby or damage to the tractor, and wherein the left-hand tool or implement will advance forwardly on a left-hand turn, thereby increasing the clearance between the left and right implement or tool being drawn by the hitch device.

A further object of the invention is to provide an improved tandem hitch device for connecting agricultural implements to a tractor, said device allowing the use of various sizes of implements, providing equal balance of the tractive force on the implements without side draft, allowing the use of different tools simultaneously, such as a disc harrow on the lead side of the hitch device and a drill on the following side of the hitch device, thus allowing the ground to be worked on one side, whereas it is seeded on the other side of the device, whereby the agricultural operations are speeded up, time and labor are saved, and the number of trips over the ground necessary in seed bed preparation greatly reduced.

A still further object of the invention is to provide an improved tandem tractor hitch device which is relatively inexpensive to manufacture, which permits one man to perform multiple operations, which is easy to attach, and which is relatively compact in size.

Further objects and advantages of the invention will become apparent from the following description and claims, and from the accompanying drawings, wherein:

Figure 2 is a front elevational view of the tractor hitch device shown in Figure 1;

Figure 3 is an enlarged cross-sectional detail view taken on line 3—3 of Figure 1;

Figure 4 is a cross-sectional view taken on line 4—4 of Figure 3;

Figure 5 is an enlarged cross-sectional view taken on line 5—5 of Figure 1;

Figure 6 is an enlarged cross-sectional view taken on line 6—6 of Figure 1.

Figure 1:
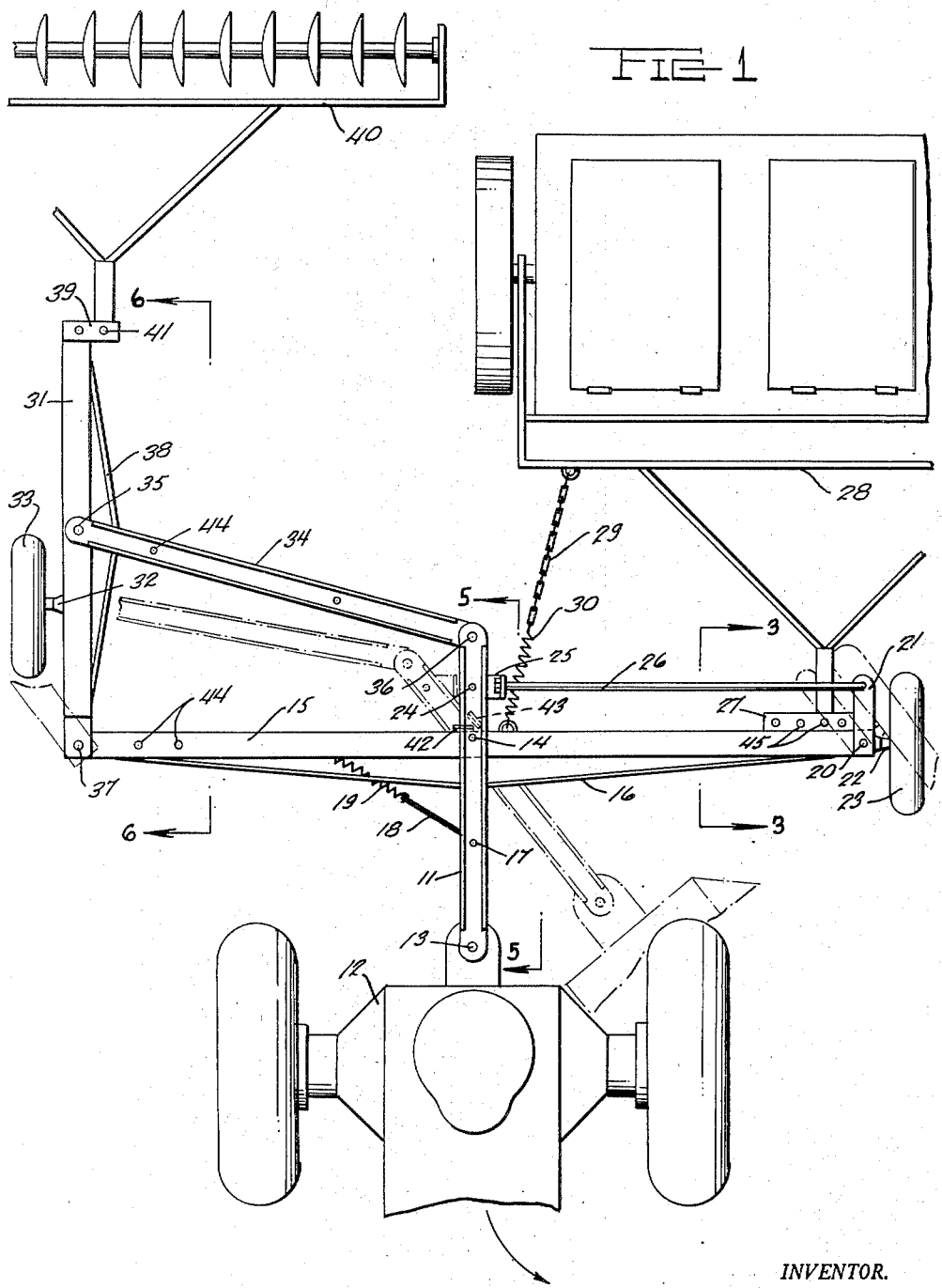
Figure 1 is a top plan view of a tractor hitch device constructed in accordance with the present invention, showing the rear portion of a tractor to which the hitch device is attached.

Referring to the drawings, 11 designates the main longitudinal drawbar of the tandem hitch device, said drawbar being adapted to be pivotally connected to the rear of a tractor 12 at 13, as shown in Figure 1. Pivotally secured to drawbar 11 by a vertical pivot pin 14 is the main transverse beam 15, said beam being stiffened and braced against flexure by a suitable truss rod, shown at 16. Pivoted to drawbar 11 at 17 is a rod 18, and connecting the end of rod 18 to the left side of beam 15, as viewed in Figure 1, is a coiled spring 19 which is placed in tension when beam 15 swings clockwise with respect to drawbar 11. Pivoted to the right end of beam 15 at 20 for rotation around a vertical axis is a wheel bracket 21 provided with a stub shaft 22 on which is journaled a ground-engaging wheel 23. Bracket 21 extends parallel to drawbar 11. Pivoted to drawbar 11 at 24 rearwardly of the main transverse beam 15 is a bracket member 25. Bracket member 25 is connected to the end of wheel bracket 21 by a tie rod 26 extending parallel to main beam 15, the end of the tie rod 26 being pivotally engaged with the wheel bracket 21, whereby a parallelogram linkage is defined by the respective elements 15, 11, 25, 26 and 21.

Secured to the right end portion of main transverse beam 15, as viewed in Figure 1, is an apertured tool-hitching plate 27. As shown in Figure 1, an agricultural tool, such as a seed drill 28, may be pivotally connected to the main beam 15 at plate 27. As shown in Figure 1, the left side portion of the drill 28 may be connected to the intermediate portion of main beam 15 by a chain 29 and a spring 30, whereby tension is developed in said spring when the drill 28 swings clockwise with respect to the beam 15.

Pivotally connected at 37 to the left end of beam 15, as viewed in Figure 1, for rotation in a horizontal plane is a longitudinal side beam 31 carrying a stub shaft 32 on which is journaled a second ground-engaging wheel 33. It will be noted that wheel 33 is spaced rearwardly with respect to wheel 23. Connecting the mid portion of side bar 31 to the end of main drawbar 11 is a link bar 34, the link bar 34 having the respective pivotal connections, shown at 35 and 36, with the side bar 31 and the drawbar 11. The distance between pivotal connections 35 and 37 is substantially greater than the distance between pivotal connections 14 and 36, so that when the drawbar 11 swings around the pivot point 14, the angular rotation of the plane of wheel 23 will be always greater than the angular rotation of the plane of wheel 33.

Side bar 31 is stiffened and braced against flexure by a suitable truss rod 38. Secured to the rear end of bar 31 is tool-hitching plate 39. An agricultural tool, such as the disc harrow 40 may be pivotally connected to plate 39 at 41, as shown in Figure 1.

When the tractor 12 makes a turn to the right, as viewed in Figure 1 (a left turn as viewed by the operator of the tractor), the drawbar 11 swings counterclockwise with respect to the main transverse beam 15, as shown in dotted view. Due to the length of the side bar 31 and the action of the inclined link bar 34, the tool 40 is moved outwardly away from the tool 28 as the turn is made, preventing collision of the tools, the tool 28 moving around the turn in advance of the tool 40. The wheel 23 turns in unison with the drawbar 11, preventing skidding of the wheel. Since the wheel 33 moves in a much greater arc in this type of turn than the wheel 23, its rate of turn must necessarily be less than that of wheel 23. This is accomplished by making the distance between pivot points 35 and 37 greater than the distance between pivot points 14 and 36, as above described. On completing the turn, the spring 19 restores the transverse beam 15 to its normal angular relation to drawbar 11. The spring 19 also provides compensation for different sizes of tools pulled simultaneously by the hitching device by allowing transverse beam 15 to assume a normal angular position with respect to drawbar 11 determined by the relative drag resistance of the two tools hitched to the device.

When the tractor makes a turn to the left, as viewed in Figure 1, i. e., a right turn as viewed by the operator of the tractor, the tool 28 automatically advances forwardly with respect to the tool 40, providing clearance between the two tools. The main transverse beam 15 carries a depending stop lug 42 which is engaged by a depending stop lug 43 carried by the drawbar 11 at the right side of lug 42, as viewed in Figure 1, which prevents main beam 15 from rotating clockwise with respect to drawbar 11. Therefore, the bracket 21 and side bar 31 remain fixed with respect to drawbar 11 when the tractor makes a turn to the left, as viewed in Figure 1. This maintains the normal spacing of the tools 28 and 40 in making such a turn.

From Figure 1 it will be seen that the left side of beam 15 and inclined link bar 34 may have one or more additional apertures 44, enabling the side bar 31 to be connected to the beam 15 and inclined link bar 34 inwardly of the position shown in Figure 1, as where a smaller tool is substituted for tool 40. The plate 27 is similarly provided with additional connection apertures 45 to enable the tool connected thereto to be positioned in balanced relation to the tool connected to side bar 31.

The above-described tandem hitching device allows the use of various sized drills or different types of tools to be employed together, such as a disc harrow on the leading side and a drill on the following side of the device, so that the ground may be worked one round ahead of the seeding tool or drill, making a perfect seed bed, speeding up planting operations and reducing the number of traversals required over the ground in seed bed preparation.

While a specific embodiment of a tandem hitch device for connecting a pair of agricultural implements to a tractor has been disclosed in the foregoing description, it will be readily understood that various modifications within the spirit of the invention may occur to those skilled in the art. Therefore, it is intended that no limitations be placed on the invention except as defined by the scope of the appended claims.

What is claimed is:

1. A tandem tractor hitch device of the character described comprising a drawbar adapted to be connected at its forward end to a tractor, a transverse beam pivotally connected at its intermediate portion to the intermediate portion of the drawbar, a side bar pivotally connected to one end portion of said beam, a first ground-engaging wheel journaled to said side bar, a first link bar connecting said side bar to the rear end portion of the drawbar, a wheel bracket pivoted to the other end portion of said beam, a second ground-engaging wheel journaled to said wheel bracket, a second link bar connecting said wheel bracket to said drawbar, said second link bar being parallel to said beam, and means for attaching respective tools to the end of the side bar and the said other end portion of the transverse beam.

2. A tandem tractor hitch device of the character described comprising a drawbar adapted to be connected at its forward end to a tractor, a transverse beam pivotally connected at its intermediate portion to the intermediate portion of the drawbar, a rearwardly-extending side bar pivotally connected to one end portion of said beam, a first ground-engaging wheel journaled to said side bar, a first link bar connecting the intermediate portion of said side bar to the rear end portion of the drawbar, a wheel bracket pivoted to the other end portion of said beam, a second ground-engaging wheel journaled to said wheel bracket, a second link bar connecting said wheel bracket to said drawbar, said second link bar being parallel to said beam, the first wheel being rearwardly spaced with respect to said second wheel and the first link bar being inwardly and forwardly inclined from said side bar, and means for attaching respective tools to the end of the side bar and the said other end portion of the transverse beam.

3. A tandem tractor hitch device of the character described comprising a drawbar adapted to be connected at its forward end to a tractor, a transverse beam pivotally connected at its intermediate portion to the intermediate portion of the drawbar, a rearwardly-extending side bar pivotally connected to one end portion of said beam, a first ground-engaging wheel journaled to said side bar, a first link bar connecting the intermediate portion of said side bar to the rear end portion of the drawbar, a wheel bracket pivoted to the other end portion of said beam, a second ground-engaging wheel journaled to said wheel bracket, a second link bar connecting said wheel bracket to said drawbar, said second link bar being parallel to said beam, the first wheel being rearwardly spaced with respect to said second wheel and the first link bar being inwardly and forwardly inclined from said side bar, means for attaching respective tools to the end of the side bar and the said other end portion of the transverse beam, means resiliently connecting the forward portion of the drawbar to the side portion of the transverse beam adjacent said side bar, and means limiting rotation of the drawbar forward portion toward the side bar.

4. A tandem tractor hitch device of the character described comprising a drawbar adapted to be connected at its forward end to a tractor, a transverse beam pivotally connected at its intermediate portion to the intermediate portion of the drawbar, a rearwardly-extending side bar pivotally connected to one end portion of said beam, a first ground-engaging wheel journaled to said side bar, a first link bar connecting the intermediate portion of said side bar to the rear end portion of the drawbar, a wheel bracket pivoted to the other end portion of said beam for rotation around a vertical axis substantially aligned with the axis of the transverse beam, a second ground-engaging wheel journaled to said wheel bracket, a second link bar connecting said wheel bracket to said drawbar, said second link bar being parallel to said beam and located rearwardly of said beam, the first wheel being rearwardly spaced with respect to said second wheel and the first link bar being inwardly and forwardly inclined from said side bar, means for attaching respective tools to the end of the side bar and the said other end portion of the transverse beam, means resiliently connecting the forward portion of the drawbar to the side portion of the transverse beam adjacent said side bar, and means limiting rotation of the drawbar forward portion toward the side bar.

CLARK W. LEIGHNOR.

REFERENCES CITED

The following references are of record in the file of this patent:

UNITED STATES PATENTS

| Number | Name | Date |
|---|---|---|
| 1,632,013 | Trauger | June 14, 1927 |
| 2,370,468 | Hyland | Feb. 27, 1945 |
| 2,391,503 | Page | Dec. 25, 1945 |